United States Patent
Pilgrim, Jr.

(10) Patent No.: US 11,338,770 B1
(45) Date of Patent: May 24, 2022

(54) TRACTOR TRAILER MONITORING SYSTEM WITH TRAILER AIR SUPPLY CONTROL AND THEFT PREVENTION AND METHOD OF USE

(71) Applicant: Gene Pilgrim, Jr., Garland, TX (US)

(72) Inventor: Gene Pilgrim, Jr., Garland, TX (US)

( * ) Notice: Subject to any disclaimer, the term of this patent is extended or adjusted under 35 U.S.C. 154(b) by 111 days.

(21) Appl. No.: 16/420,277

(22) Filed: May 23, 2019

(51) Int. Cl.
| | |
|---|---|
| B60R 25/00 | (2013.01) |
| B60R 25/08 | (2006.01) |
| B62D 53/06 | (2006.01) |
| B60R 25/102 | (2013.01) |
| B60R 25/32 | (2013.01) |
| B60T 7/16 | (2006.01) |
| B60T 7/20 | (2006.01) |
| B60R 25/33 | (2013.01) |

(52) U.S. Cl.
CPC ............ *B60R 25/08* (2013.01); *B60R 25/102* (2013.01); *B60R 25/32* (2013.01); *B60R 25/33* (2013.01); *B60T 7/16* (2013.01); *B60T 7/20* (2013.01); *B62D 53/06* (2013.01); *B60R 2325/205* (2013.01)

(58) Field of Classification Search
CPC ......... B60R 25/08; B60R 25/33; B60R 25/32; B60R 25/102; B60T 7/16; B60T 7/20
See application file for complete search history.

(56) References Cited

U.S. PATENT DOCUMENTS

| | | | | |
|---|---|---|---|---|
| 6,701,781 | B1* | 3/2004 | Lutowsky, Jr. | G01F 1/69 73/204.25 |
| 9,033,116 | B2* | 5/2015 | Breed | B60T 1/005 303/89 |
| 2001/0050509 | A1* | 12/2001 | Holt | B60T 17/18 303/89 |
| 2008/0143593 | A1* | 6/2008 | Graziano | H04B 7/185 342/357.09 |
| 2008/0157942 | A1* | 7/2008 | Payne | B60R 25/33 340/426.12 |
| 2016/0280267 | A1* | 9/2016 | Lavoie | B62D 15/0285 701/23 |
| 2018/0099712 | A1* | 4/2018 | Bean | B62D 63/08 340/431 |
| 2020/0068277 | A1* | 2/2020 | Drewett | H04Q 9/00 |

* cited by examiner

*Primary Examiner* — Russell Frejd
*Assistant Examiner* — Brittany Renee Peko
(74) *Attorney, Agent, or Firm* — Leavitt Eldredge Law Firm

(57) ABSTRACT

A tractor trailer monitoring system includes a network having a server and a database; a first computing device; a monitoring platform to be accessible from the first computing device; a tractor trailer system, having a tractor unit; an air supply control system to control air supply to a brake system of the trailer, the air supply control system having a CPU to receive commands from the first computing device; the first computing device and monitoring platform are to receive an identifying code from a user to activate air supply to the brake system of the trailer.

7 Claims, 7 Drawing Sheets

TRACTOR TRAILER MONITORING SYSTEM WITH TRAILER AIR SUPPLY CONTROL AND THEFT PREVENTION AND METHOD OF USE

BACKGROUND

1. Field of the Invention

The present invention relates generally to tractor trailer systems, and more specifically, to a tractor trailer monitoring system for off-site monitoring of a tractor trailer, as well as an air supply control system to prevent theft.

2. Description of Related Art

Tractor trailer systems are well known in the art and are effective means to haul and transport cargo. For example, FIG. 1 depicts a conventional tractor trailer system 101 having a semi-trailer 103 attached to a tractor unit 105. During use, system 101 must be frequently examined for mechanical functionality and safety.

In FIG. 2, a flowchart 201 depicts a method of monitoring system 101. The driver must stop driving and either personally examine various components of system 101, such as tire pressure, or have a professional mechanic examine system 101, as shown with boxes 203, 205, 207.

One of the problems commonly associated with system 101 is inadequate monitoring. For example, various elements of system 101 can change rapidly, thereby becoming a safety hazard for the driver and others. One particular example is the ability of the tires of system 101 to change tire pressure quickly, thereby creating a potential to explode and cause an accident.

Another problem commonly associated with system 101 is trailer theft. It should be appreciated and understood that the braking system of trailers functions by connecting to a truck, wherein the truck supplies air to release the brakes of the trailer system and therefore transport the trailer. At times, a user must leave their trailer unattended, at which time theft may occur when an unauthorized person hooks up to the trailer, thereby supplying air, releasing the brakes, and allowing the trailer to be transported.

Accordingly, although great strides have been made in the area of tractor trailer systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
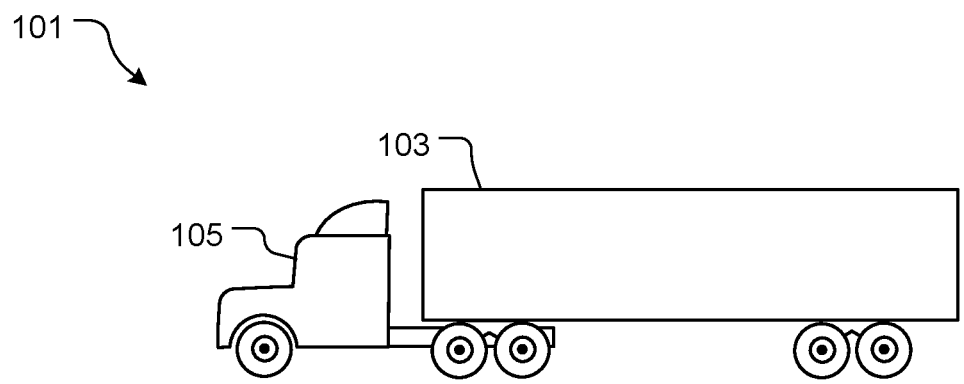
FIG. 1 is a side view of a common tractor trailer system.
Figure 2:
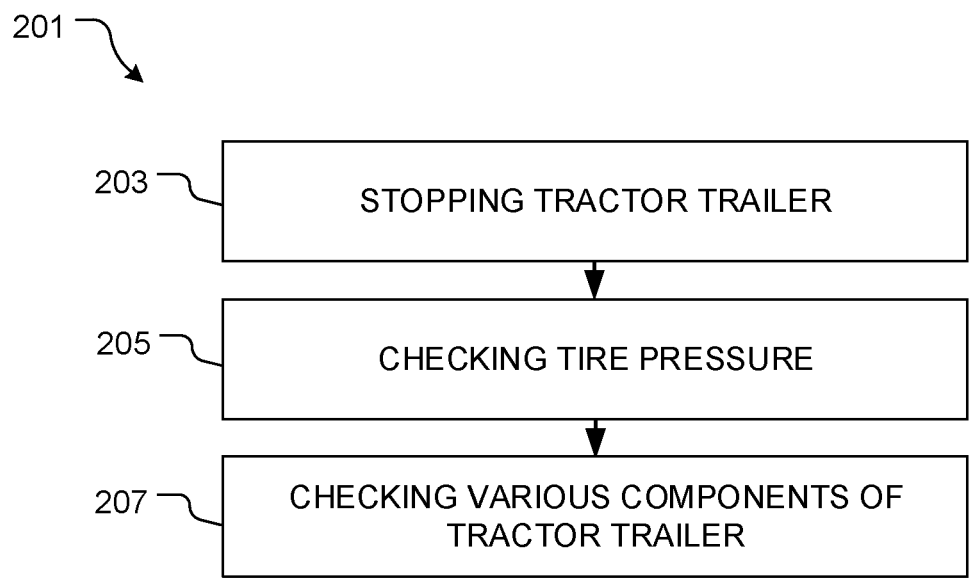
FIG. 2 is a flowchart of the method of monitoring the tractor trailer system of FIG. 1.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional tractor trailer systems. Specifically, the present invention provides a means to have real-time monitoring of various elements of a tractor trailer system. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 3:
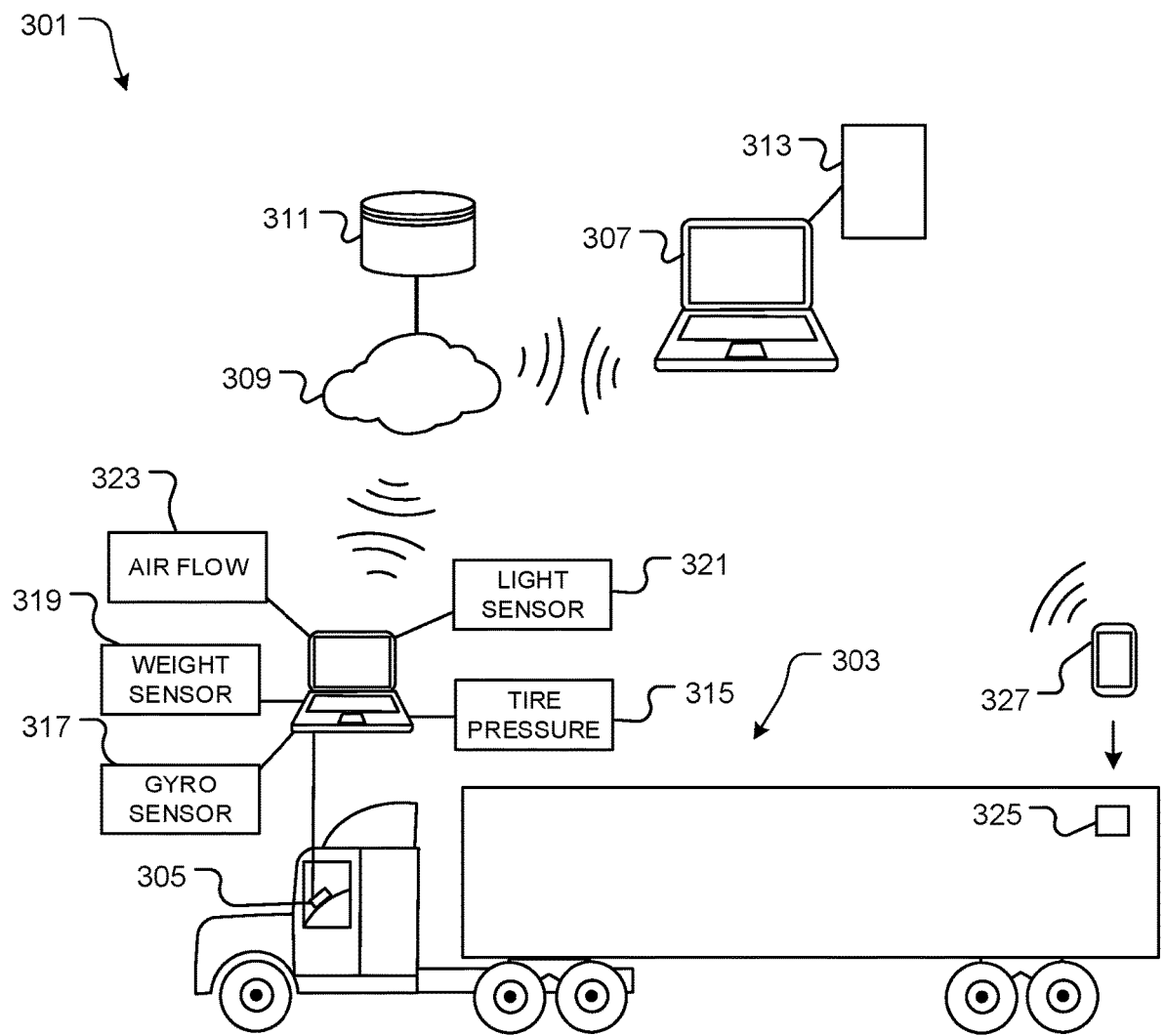
FIG. 3 is a simplified schematic of a tractor trailer monitoring system in accordance with a preferred embodiment of the present application.

Referring now to the drawings wherein like reference characters identify corresponding or similar elements throughout the several views, FIG. 3 depicts a simplified schematic of a tractor trailer monitoring system 301 in accordance with a preferred embodiment of the present application. It will be appreciated that system 301 overcomes one or more of the above-listed problems commonly associated with conventional tractor trailer systems.

In the contemplated embodiment, system 301 includes a tractor trailer 303 having a computing device 305 in communication with a plurality of sensors incorporated into the tractor trailer. Computing device 305 is configured to transmit data received from the plurality of sensors to a second computing device 307 via a wireless network 309, wherein the data is stored on a database 311 for monitoring via a monitoring platform 313. It is contemplated that monitoring platform 313 can be a website or a mobile application. It should be appreciated that this configuration allows for operations personnel to monitor various components of the tractor trailer 303 in real-time from a distance.

It should be appreciated that one of the unique features believed characteristic of the present application is the use of a second computing device for monitoring the various components of the tractor trailer. It should be appreciated that this configuration allows for real-time monitoring, thereby improving safety associated tractor trailers.

In the preferred embodiment, system 301 includes a tire pressure sensor 315 configured to determine the tire pressure associated with one or more tires of tractor trailer 303 and transmit the tire pressure to the computing device 307 for monitoring. An additional sensor contemplated is a gyro sensor 317 configured to transmit data relating to the motion of tractor trailer 303. It should be appreciated that sensor 317 can provide information related to accidents, sudden stops, or other unusual motions of tractor trailer 303. System 301 can further include one or more weight sensors 319 configured to relay information related to load weight per axel of tractor trailer 303. System 301 can also include one or more light sensors 321 configured to read voltage data of tractor trailer 303 and thereby provide information relating to light function. It is further contemplated that system 301 can include an air flow sensor 323 configured to determine the flowrate of air through an engine of system 301 and transmit the flowrate to computer 307 to be monitored. It should be appreciated that various other sensors could be incorporated into system 301 to provide additional monitoring.

It is contemplated that system 301 can further include a RFID tag 325 configured to be scanned by a mobile device 327, wherein RFID tag 325 provides information related to cargo being transported with tractor trailer 303. The information received from tag 325 can be transmitted to computing device 307.

Figure 4:
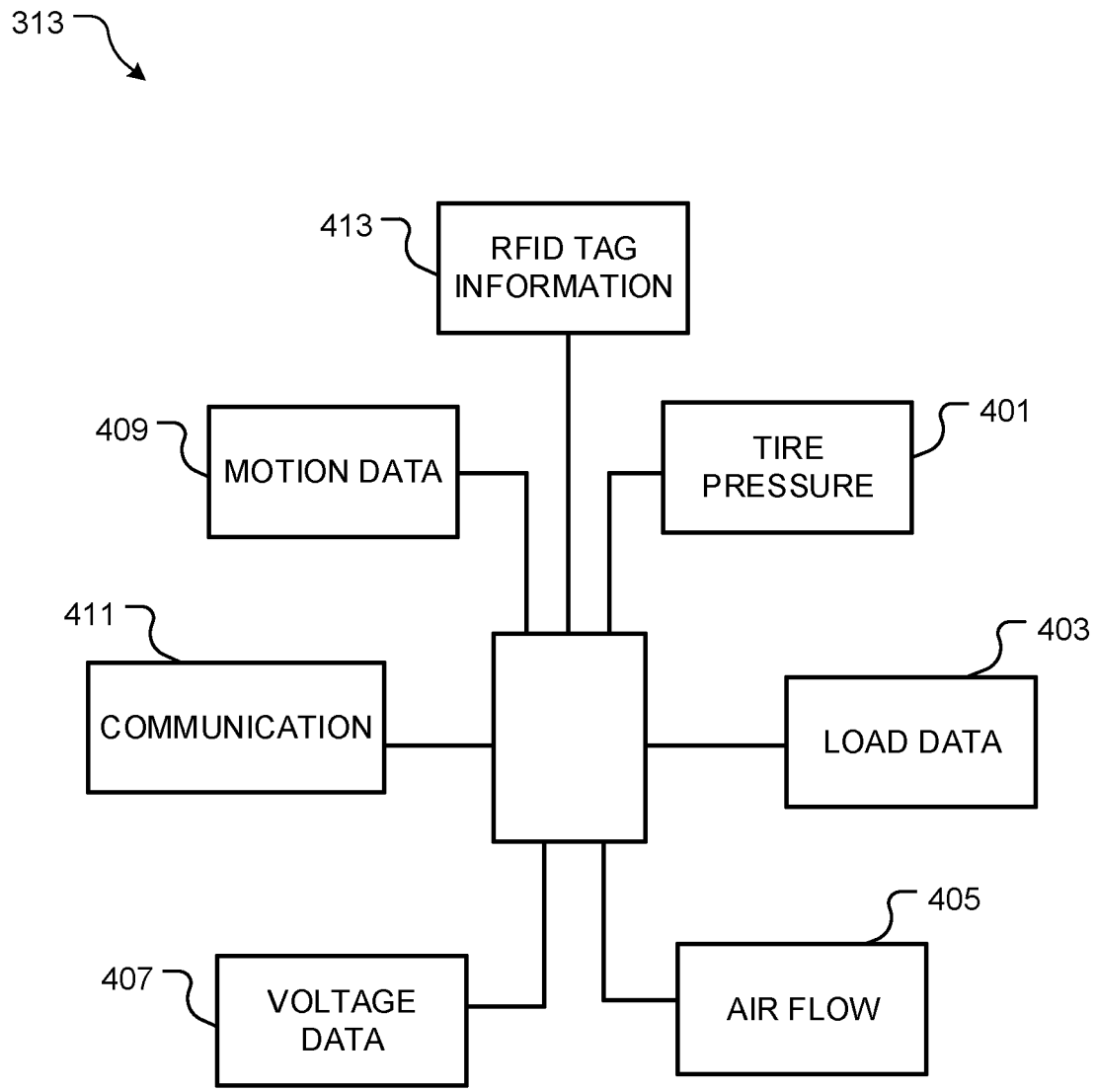
FIG. 4 is a simplified schematic of a monitoring platform of FIG. 3.

In FIG. 4, a simplified schematic of platform 313 is shown. Platform 313 is configured to provide a means for operations personnel to monitor various functions of tractor trailer 303 in real time from a distance. Platform 313 is configured to receive and record information related to tire pressure 401, load data 403, air flow 405, voltage data 407, and motion data 409 from the plurality of sensors incorporated into tractor trailer 303. The information received is presented to operations personnel through platform 313. Platform 313 can further include a communications portal 411, wherein operations personnel can contact a driver to indicate that there is a problem with tractor trailer 303. It should be appreciated that communications portal 411 can be configured to call, email, or send a text to the driver. In addition, platform 313 can be configured to receive RFID tag information 413 from a mobile device, thereby providing operations personnel with information relating to cargo being transported with tractor trailer 303.

Figure 5:
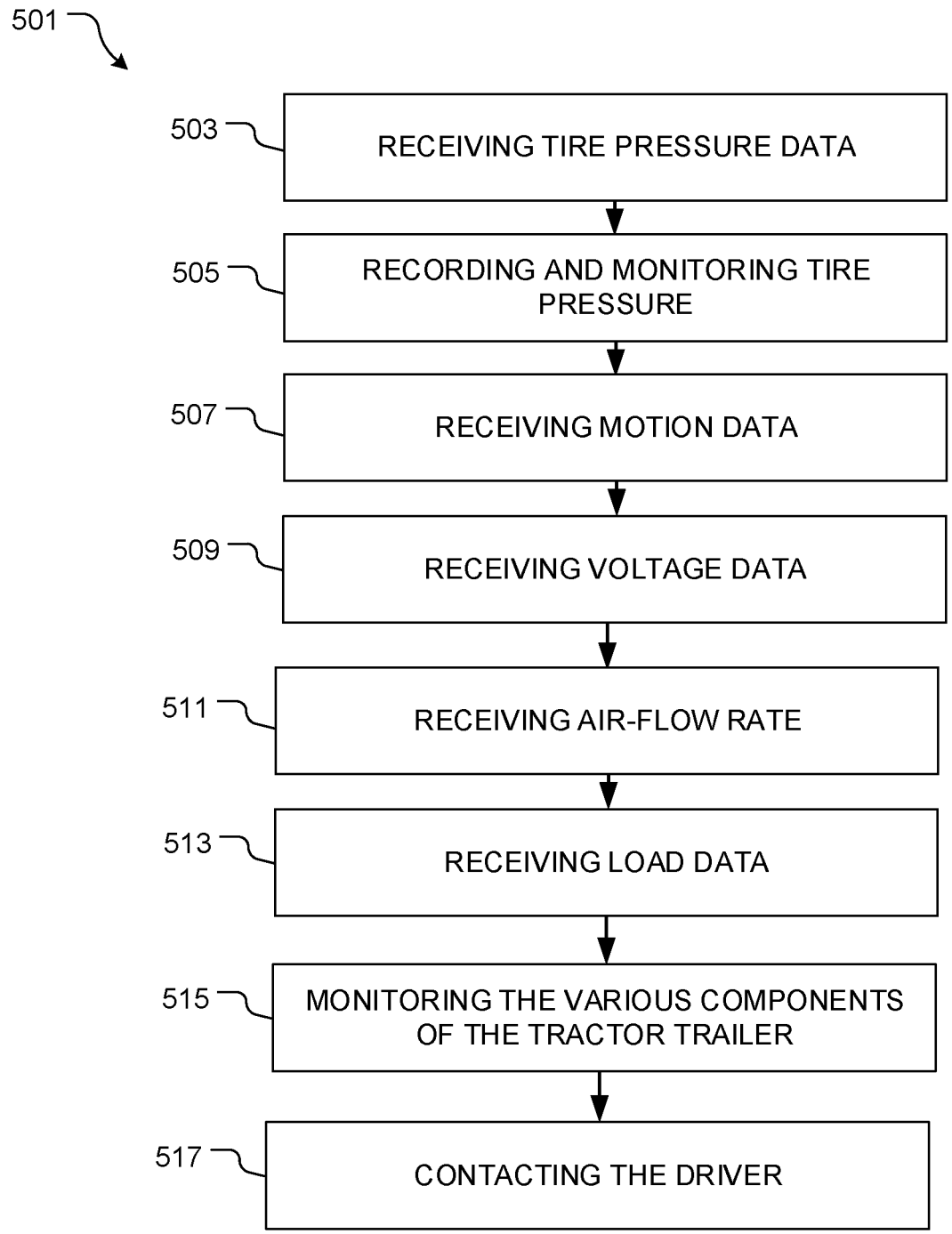
FIG. 5 is a flowchart of the method of FIG. 3.
Figure 6:
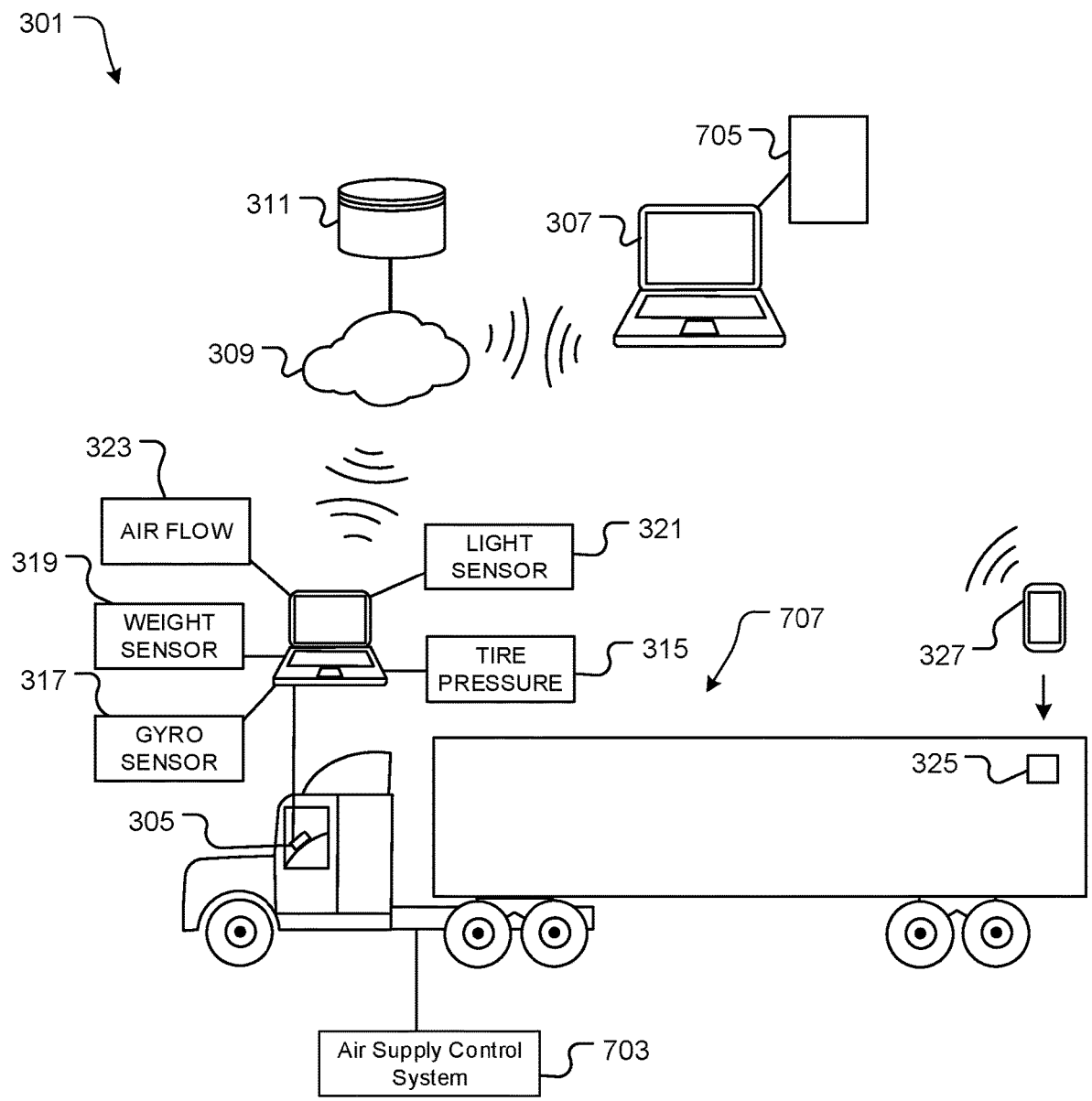
FIG. 6 is a simplified schematic of a tractor trailer monitoring system with an air supply control system in accordance with an alternative embodiment of the present application.

In FIG. 5, a flowchart 501 depicts the method of system 301. The operations personnel receive and record information associated with the plurality of sensors, including tire pressure information, motion data, voltage data, air-flow rate, and load data, as shown with boxes 503-513. The operations personnel can then monitor the various components of tractor trailer 303 through platform 313, as shown with box 515. In the event that a problem arises, the operations personnel can contact the driver of tractor trailer 303 to alert the driver of the problem, as shown with box 517.

Figure 7:
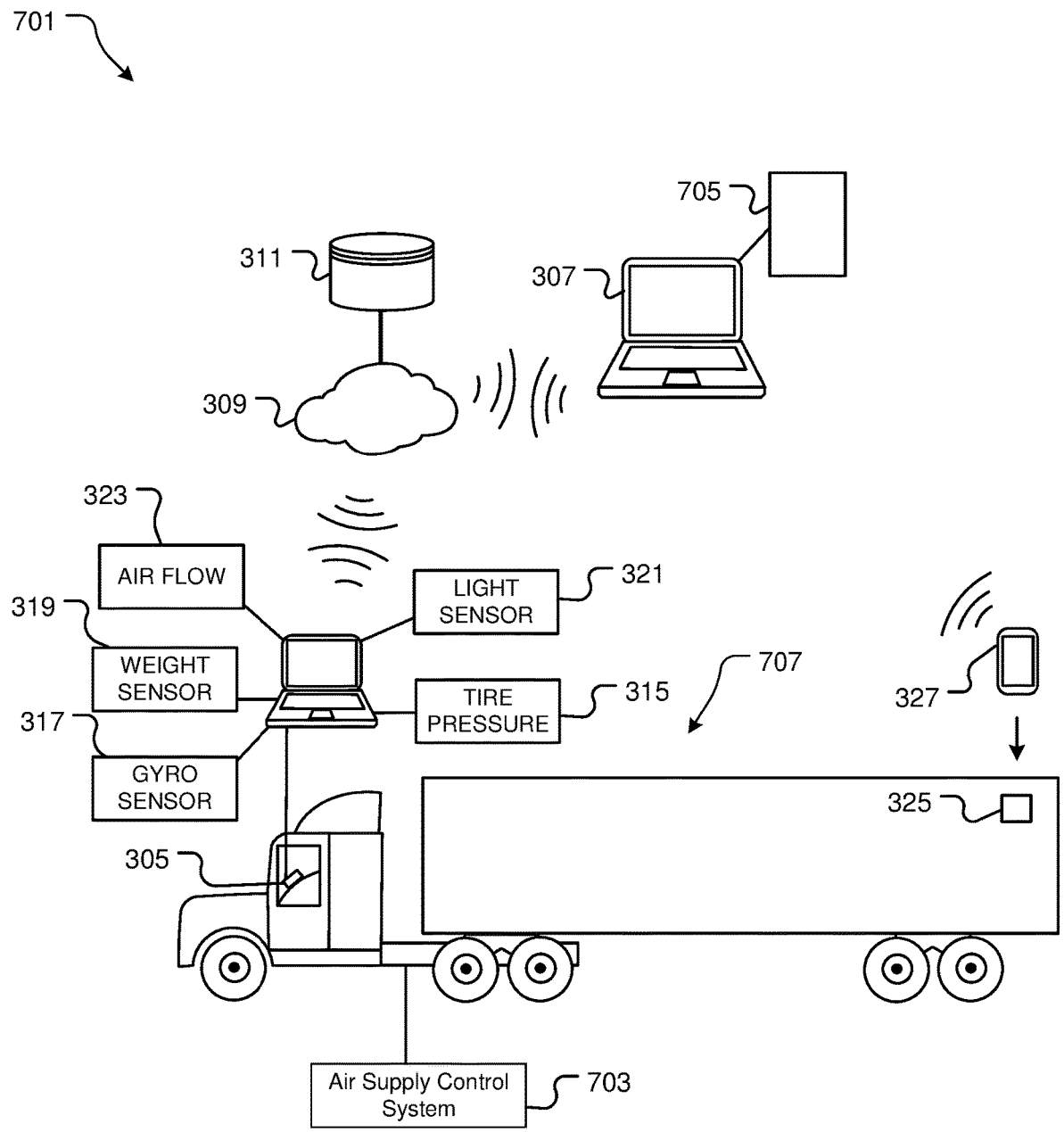
FIG. 7 is a simplified schematic of the air supply control system of FIG. 6.

In FIG. 7, a simplified schematic of a tractor trailer monitoring system 701 with an air supply control system 703 is shown. In this embodiment, system 701 can include any of the feature discussed above, including the plurality of sensors 315, 317, 319, 321, 323 configured to collect and transmit data to one or more computing devices 305, 307, via network 309 and database 311. In this embodiment, a platform 705 can be accessed from any of a number of computing devices, including phones, tablets, computers, and the like, thereby providing a means for a user to input commands and identifying information from any number of locations.

Figure 8:
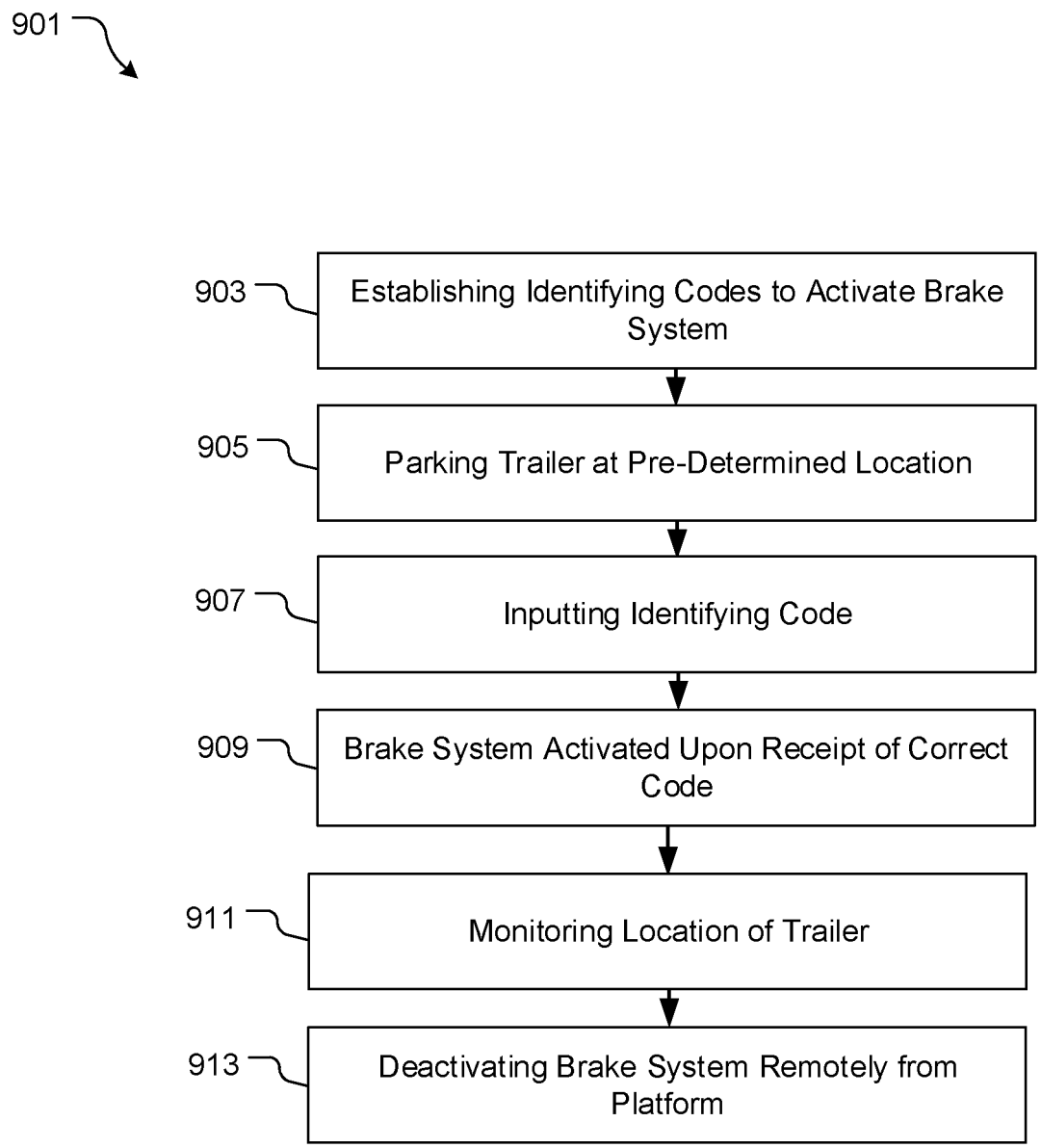
FIG. 8 is a flowchart of the method of FIG. 6.

Platform 705 is configured to provide a means to wirelessly communicate with the air supply control system 703, and activate or deactivate air supply to the brake system of trailer 707. As shown in FIG. 8, in the preferred embodiment, the air supply control system 703 includes a manifold 801 (of any form or function capable of providing the following features) controlled via any form of central processing unit/computing device 803 to activate and deactivate air supply 805 from the tractor to the trailer brake system 807.

In the preferred embodiment, the CPU 803 is configured to wirelessly communicate with a computing device 809 via a transceiver 811, such as a smart phone or tablet. The computing device 809 and platform 705 receive an identification code 813 in order to activate the air supply 805 through the manifold 801 to brake system 807. System 701 prevents theft of the trailer by allowing the user to pre-establish one or more identification codes, wherein one of the pre-established identification codes is needed to activate the air supply to brake system. Without the identification code, an unauthorized user cannot activate the air supply, and therefore cannot disengage the brakes and remove the trailer. It should be appreciated that the identification code can be a password, numerical code, facial recognition, a fingerprint, an RFID tag, or any other form of identification that ensures only authorized personnel can activate the air supply.

It is contemplated that in some embodiments, the CPU further includes a GPS 815 which allows for the transmission of location information to computing device 809. This can allow for remote monitoring of the system by the user. In addition, it is contemplated that platform 705 can receive a deactivation command 817 from the user, thereby allowing for the user to deactivate the brake system remotely, in the event that the trailer has been removed from an unauthorized person.

It should be appreciated that one of the unique features believed characteristic of the present application is the incorporation of an air supply control system 703 with remote monitoring and deactivation, thereby allowing for improved monitoring and reduced threat of theft of the trailer.

In FIG. 9, a flowchart 901 depicts the method of use of system 701. During use, the identifying codes are established to be associated with one or more authorized users of the tractor trailer, as shown with box 903. After the trailer is parked at a pre-determined location, and a truck used subsequently hooked back up to the trailer, one of the pre-established identifying codes must be input into the platform in order to activate the brake system and release the brakes, as shown with boxes 905, 907, 909. If needed, the user can further monitor the location and deactivate the brake system via the platform, as shown with boxes 911, 913.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A tractor trailer monitoring system, comprising:
   a wireless network having a server and a database;
   a first computing device;
   a monitoring platform configured to be accessible from the first computing device;
   a second computing device providing remote access to the monitoring platform to review data transmitted by the first computing device;
   a tractor trailer system, having:
     a tractor unit;
     an air supply control system in wireless communication with the monitoring platform via the second computing device and configured to control air supply to a brake system of the trailer, the air supply control system having a CPU configured to receive commands for activation and deactivation from the second computing device while the second computing device is at a remote location compared to the tractor trailer system;
   a gyro sensor configured transmit motion data to the first computing device;
   a light sensor configured to transmit voltage data to the first computing device;
   an air flow sensor configured to transmit air flowrate into an engine of the tractor unit to the first computing device;
   a plurality of weight sensors configured to transmit load data to the first computing device; and
   a second computing device in data communication with the monitoring platform, the second computing device is configured to receive air flow data from the air supply control system and motion data of the trailer from the gyro sensor;
   wherein the second computing device and monitoring platform are configured to receive an identifying code from a user to activate air supply to the brake system of the trailer, thereby controlling operation of the brake system and movement of the tractor trailer system.

2. The system of claim 1, wherein the air supply control system further comprises:
   a GPS unit configured to transmit location information to the first computing device.

3. The system of claim 1, wherein the air supply control system further comprises:
   a manifold configured to control air supply to the brake system.

4. The system of claim 1, wherein the tractor trailer system further comprises:
   an RFID tag configured to be scanned by a mobile device;
   wherein the RFID tag is configured to provide information related to a cargo of the tractor trailer system; and
   wherein the mobile device is configured to transmit the information to the monitoring platform.

5. A method of preventing theft of a tractor trailer, the method comprising:
   providing the system of claim 1;
   establishing one or more identifying codes associated with the air supply control system; and
   inputting one of the one or more identifying codes into the first computing device via the monitoring platform;
   wherein receipt of the one of the one or more identifying codes activates airflow to the brake system.

6. The method of claim 5, further comprising:
   monitoring a location of the tractor trailer via a GPS system of the monitoring platform.

7. The method of claim 5, further comprising:
   deactivating air flow to the brake system via a command input into the monitoring platform.

* * * * *